UNITED STATES PATENT OFFICE.

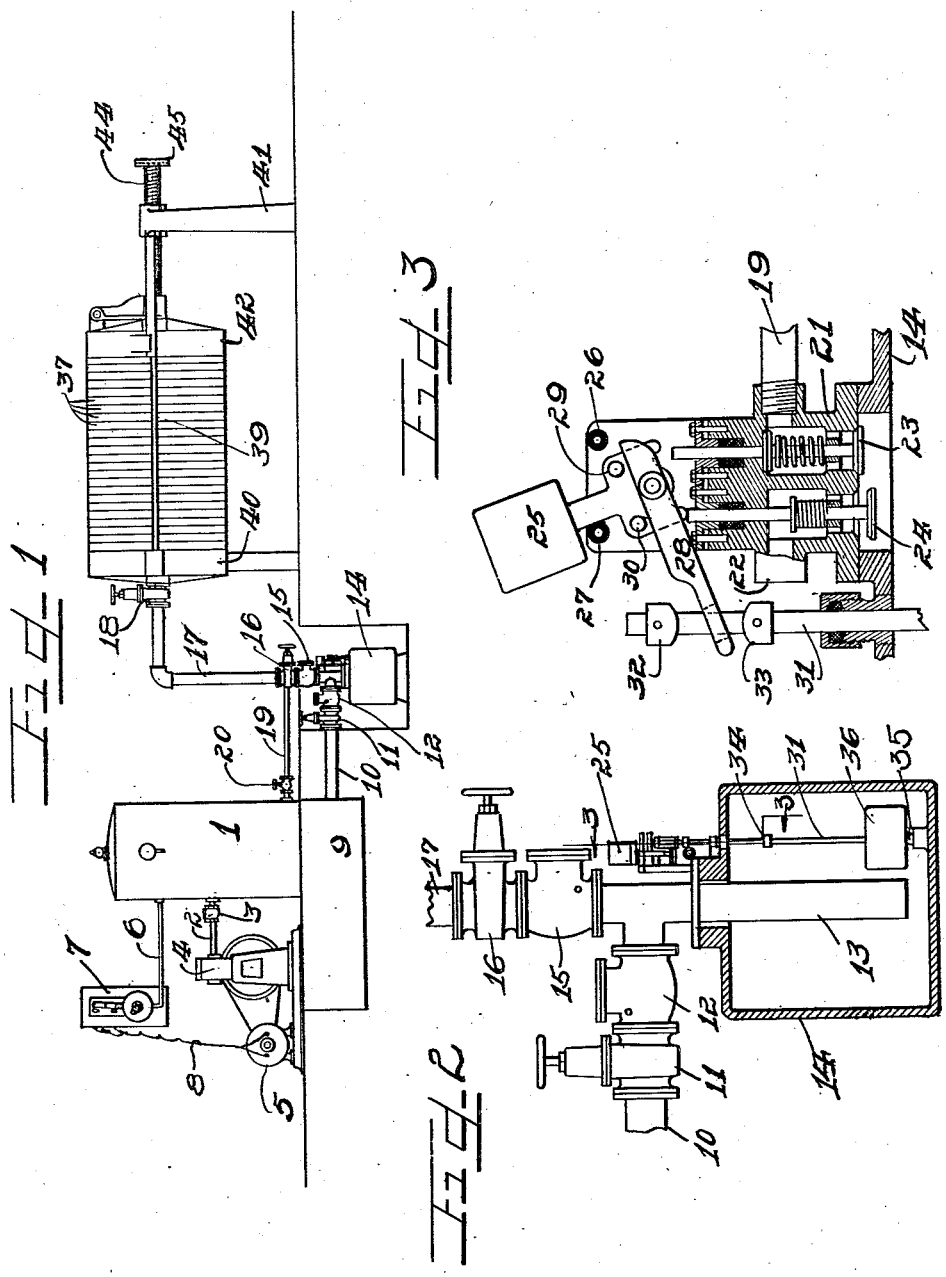

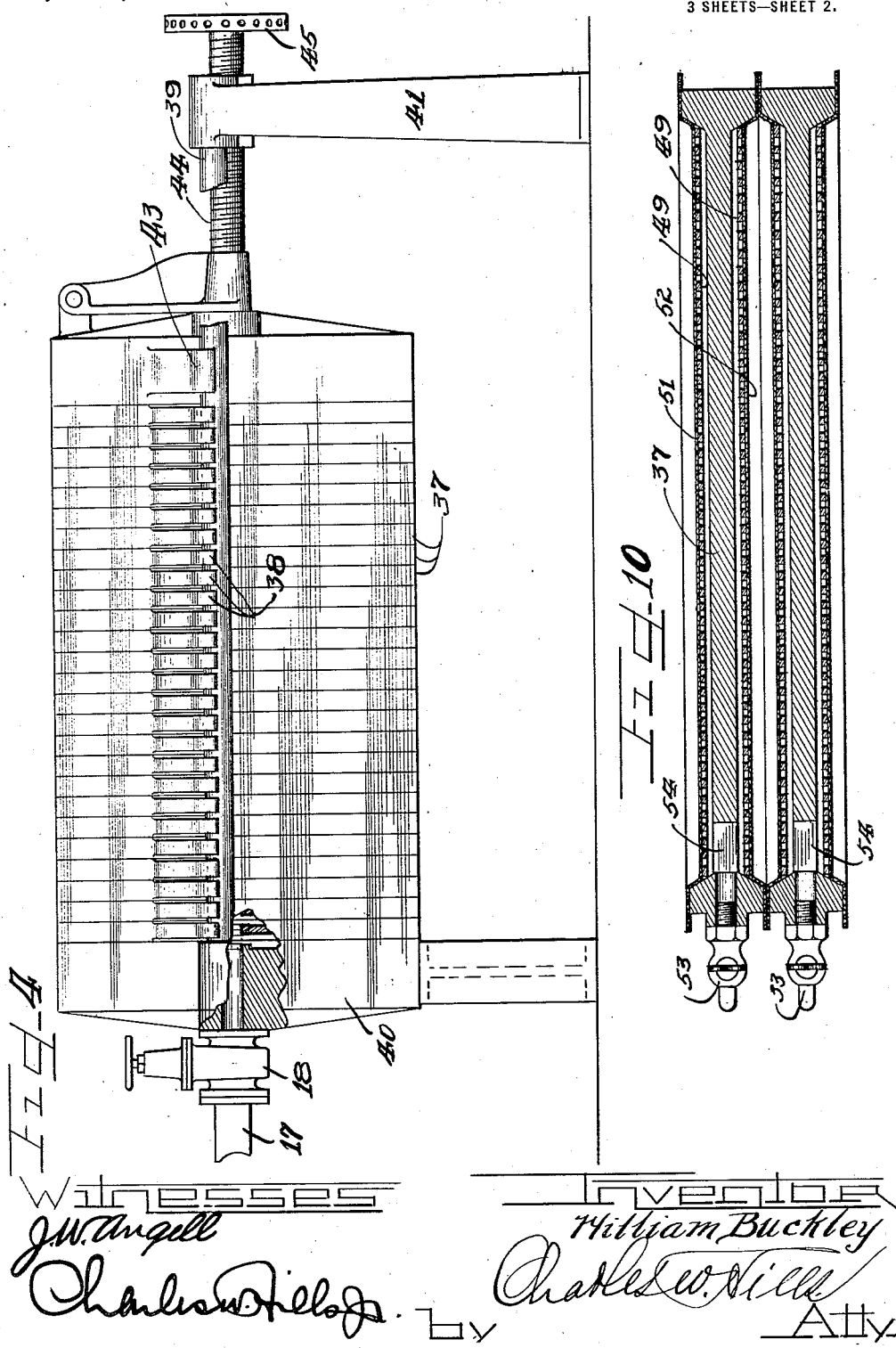

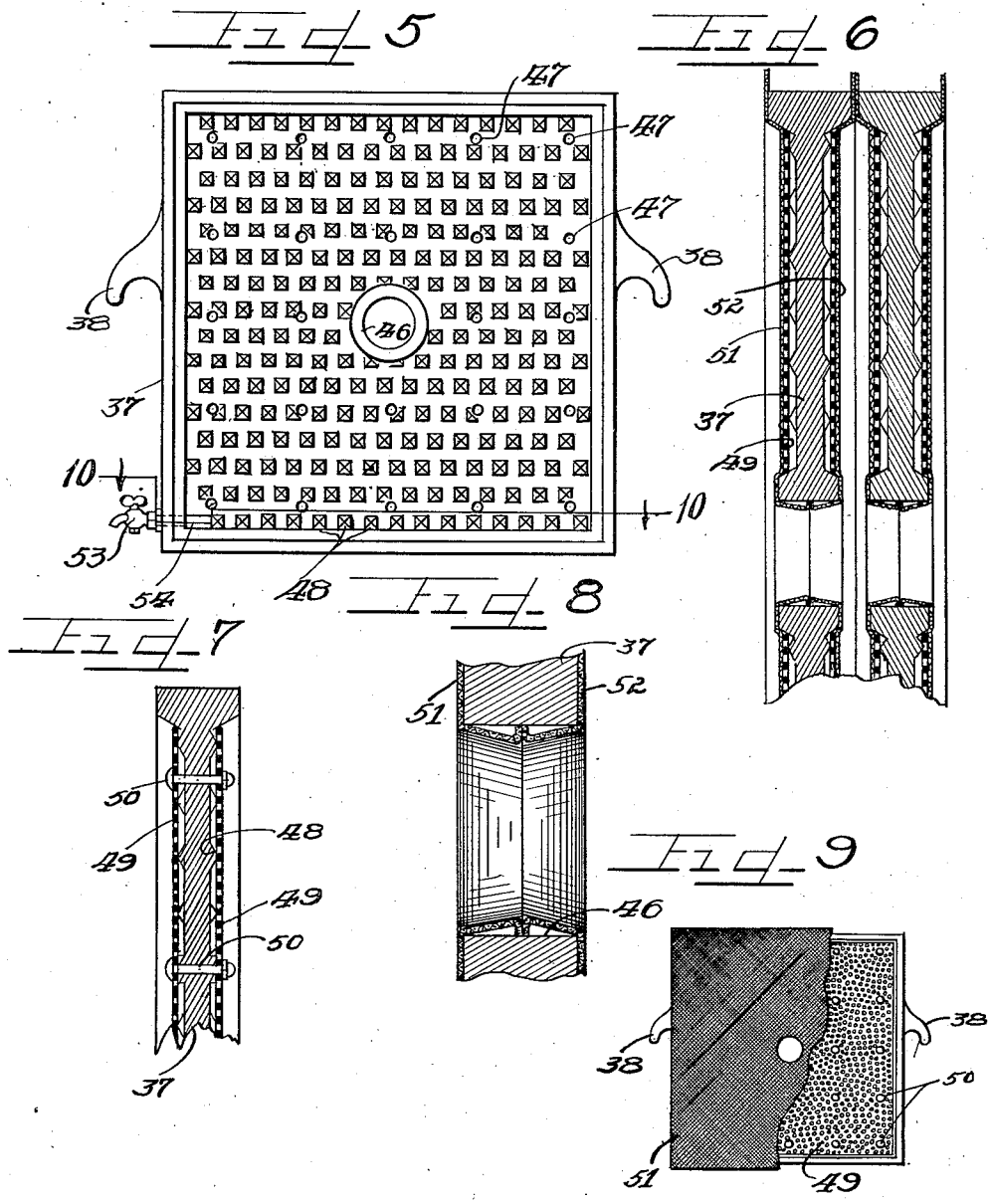

WILLIAM BUCKLEY, OF CHICAGO, ILLINOIS.

APPARATUS FOR PRESSING ACTIVATED SLUDGE.

1,271,425. Specification of Letters Patent. Patented July 2, 1918.

Application filed July 20, 1916. Serial No. 110,298.

*To all whom it may concern:*

Be it known that I, WILLIAM BUCKLEY, a citizen of the United States, and a resident of the city of Chicago, in the county of Cook and State of Illinois, have invented certain new and useful Improvements in an Apparatus for Pressing Activated Sludge, of which the following is a specification, reference being had to the accompanying drawings, and to the numerals of reference marked thereon, which form a part of this specification.

This invention relates to an apparatus for treatment of sewage to recover the sludge or matter in suspension therein, and to press the same into cake form for subsequent use as a fertilizer or for other purposes.

It is an object of this invention to construct an automatically operating apparatus for the recovery of sludge from sewage, operating to introduce the sewage into a filter press under pressure, wherein the solid matter is separated from the liquid and formed under the pressure used into cakes.

It is also an object of this invention to construct an apparatus operating automatically to obtain the sludge liquid from the sludge tank by gravitation, and to transfer the same under pressure to a sludge press wherein the sludge is separated out under the pressure used in the apparatus into cakes, which may be readily removed from the plates of the sludge press.

It is also an object of this invention to construct an apparatus for the recovery of sludge from sewage embracing an air receiver and an air compressor, with means for operating the air compressor only at times that the pressure falls within the air receiver, and with an automatically operating sludge ram adapted to receive certain quantities of the sludge liquid or sewage therein, and then under the pressure from the air receiver transfer the same to the sludge press wherein the sludge is removed and the liquid filtered off.

It is furthermore an object of this invention to construct an apparatus for the recovery of sludge from sewage, consisting of a sludge press adapted to receive the sludge liquid under air pressure, with means operating automatically to control and maintain the air in an air receiver at a predetermined pressure, and used in connection with a ram which receives a predetermined quantity of the sludge fluid by gravitation therein, and operates to force the same under the air pressure of the receiver to and through the sludge press.

It is finally an object of this invention to construct an improved type of apparatus for the recovery of sludge from sewage, wherein quantities of sewage are supplied by gravitation into a ram or receiver from which the same are expelled under air pressure automatically to a sludge press to recover the sludge therein.

The invention (in a preferred form) is illustrated in the drawings and hereinafter more fully described.

In the drawings:

Figure 1 is a diagrammatic view of the apparatus embodying the principles of my invention.

Fig. 2 is an enlarged detail view partly in section of the automatically acting ram.

Fig. 3 is a fragmentary detail section taken on line 3—3 of Fig. 2.

Fig. 4 is a side elevation partly broken away of the sludge press.

Fig. 5 is a face view of one of the sludge press plates detached and with the screening and filtering means removed.

Fig. 6 is a fragmentary central vertical section taken through the upper portion of a pair of the sludge press plates.

Fig. 7 is a fragmentary detail section through one of the sludge press plates with the filtering material omitted and showing the method of attachment of the perforated or screen plates by which the filtering material is held spaced away from the press plate itself.

Fig. 8 is an enlarged central vertical section through the middle of one of the sludge press plates.

Fig. 9 is a reduced face view of one of the sludge press plates with the filtering material shown broken away.

Fig. 10 is a detail section through a pair of the sludge press plates taken on line 10—10 of Fig. 5.

As shown in the drawings:

Referring first to Fig. 1, the apparatus embodies an air receiver 1, an inlet air pipe 2, communicating therewith through a check valve 3, and leading from an air compressor 4, which is driven by an electric motor 5. A small air line 6, leads from the air receiver 1, to an automatic switch 7, which operates when the pressure falls below a certain predetermined amount to close the electric circuit of the line wires 8, to the electric motor 5, and to open the circuit after a predetermined pressure has been reached in said air receiver. The automatic switch mechanism 7, may be of any suitable type, but since the operation of these devices is well known, the particular construction thereof so far as the present invention is concerned is immaterial, and details thereof are not entered into. Disposed at any convenient point but as shown below the air receiver 1, is a sludge tank or container 9, into which the sewage for treatment is first admitted. An outlet pipe 10, leads from the sludge tank 9, through a gate valve 11, which in turn is connected to a check valve 12, and said check valve 12 as clearly shown in the enlarged view in Fig. 2, is connected to a dip pipe 13, which leads downwardly through the upper end of the tank or reservoir 14 of a ram. Connected on the upper end of the pipe 13, is another check valve 15, and beyond the same is another gate valve 16, from which an outlet pipe 17, leads upwardly through a gate valve 18, into a sludge press.

An air line connection is also provided between the receiver 1, and the automatic sludge ram reservoir 14, and for this purpose a pipe 19, having a globe valve 20, therein, leads from the receiver 1, into a valve casing 21, which is mounted on the upper end of the ram reservoir 14, and is provided with an air release or relief pipe 22. Automatically operating mechanisms are provided for opening and closing the respective inlet and outlet through said pipes 19 and 22, respectively, to the reservoir of the sludge ram. This particular mechanism however, constitutes the subject matter of my patent for "Fluid pressure operated ejectors," No. 1,127,726, Feb. 9, 1915, and hence only a brief description thereof will be incorporated here.

A spring thrust valve 23, serves to close the opening through the valve casing 21, leading from the pipe 19 into the reservoir 14, and a similar valve 24, serves to close the opening from the reservoir 14, through the valve casing 21, leading to the outlet or air relief pipe 22. The upper ends of the stems of said respective valves 23 and 24, project outwardly through suitable packing means on the upper end of the valve casing 21, in a position such that the same may be struck downwardly by a weighted pivoted lever 25, which in one position such as shown in Fig. 3, opens the valve 24, and in the opposite extreme position permits closure of the valve 24, and opens the valve 23. Said weighted pivoted lever 25, is limited in its movement from side to side by stops 26 and 27, respectively. Pivoted co-axially with, but independently of said lever 25, is a lever 28, and stops 29 and 30, respectively, are provided on said weighted lever 25, for contact by said lever 28, whereby the weighted lever may be shifted past dead center position by said lever 28, and continue its course to its extreme position by gravity. For the purpose of actuating said lever 28, whereby the weighted lever 25, may be shifted, and the valves 23 and 24 operated, a long stem 31, is slidably mounted through the top wall of the reservoir 14, of the sludge ram, and is provided thereon with stops 32 and 33, respectively, adapted to contact with the end of said lever 28 in its upward and downward movement. Within the reservoir 14, of the sludge ram, stops 34 and 35, respectively, are secured upon said rod 31, and slidably mounted therebetween is a float 36, so that when the level of liquid in the reservoir 41, admitted through the tubular pipe 13, rises, the float is elevated against the stop 34, which thereby elevates the rod 31, which in turn causes actuation of the weighted lever 25, operating the valves 23 and 24.

The sludge press consists of a plurality of similarly constructed plates 37, each of which as clearly shown in Figs. 4 and 5 is provided on each side with downwardly turned hooks or arms 38, which serve to sustain the weight of the plates and hold the plates slidably and properly disposed upon the sludge press frame by movement over horizontal bars 39. Said horizontal frame bars 39, are supported at each of their ends in end frame members 40 and 41, respectively, of which the end frame member 40 forms a fixed head at one end of the sludge press into which the outlet pipe 17, communicates through the gate valve 18. A movable follower head 42, is provided with guide hooks or arms 43, which serve to support the same upon the bars 39, and extending into said movable head 42, is a threaded shaft 44, which also extends through a threaded bearing in the frame 41. At its outer end said shaft is provided with a hand wheel 45, so that by rotation of the shaft, the movable head 42, is caused to travel upon the supporting guide bars 39.

Referring now to the particular construction of the press plates 37, each thereof is of greater depth or thickness at its periphery as clearly shown in Figs. 6 and 7, and each is provided with a relatively large central aperture 46, therethrough as shown in Figs. 5 and 8. A plurality of small apertures 47, are provided through each of the plates 37, spaced apart over the area thereof. Each surface of each of the plates 37, is provided with a plurality of diamond pointed projections 48, and bolted over the respective surfaces of the plates 37, and held spaced outwardly therefrom by said diamond pointed projections 48, are perforated or screen plates 49, held retained in position thereon by round headed bolts 50. Stretched over the perforated screen plates 49, are filtering fabrics, that for each plate consisting of two rectangular portions 51 and 52, one for each side respectively, and each provided with a central aperture therethrough with the fabric of the margins of the respective rectangular portions at the central apertures stitched together as clearly shown in Fig. 8. Thus each plate 37, is completely inclosed at all points within the filtering fabric the outer margins of said fabric, being clamped between the peripheral margin of the press plates, which are in turn clamped together in a manner shown in Figs. 6 and 10. At one side of each of the press plates 37 at the lower end thereof, a drain cock 53, is secured therein communicating with a passage 54, through the lower end of the press plate to which the filtrate circulating through the filtering material drains downwardly on each side of the plate.

The operation is as follows:

The sewage or sludge liquid to be treated for the recovery of the sludge is first run into the storage tank 9, from which it may flow by gravity, or be pumped if necessary, through the outlet pipe 10, through the gate valve 11, and check valve 12, into the sludge ram reservoir 14. As the level of the sludge liquid rises within the reservoir 14, the float 36, rises therewith striking against the stop 34, so that an elevation of the rod 31, takes place, thereby throwing the weighted lever 25, from the position shown in Fig. 3, to its opposite extreme position to the right. When the weighted lever 25, is in the position shown in Fig. 3, the air relief valve 24, is open so that as the sludge liquid enters the ram 14, the air may be readily expelled through the outlet 22. However, as the weighted lever 25, is thrown to the right, the valve 24, is permitted to close under the stress of its spring, and the valve 23, is opened, thereby opening the air line 19, leading the air line 19, leading into the ram 14, from the air receiver 1, and as a consequence the contents of the ram are placed under considerable pressure. This serves to expel the contents of the ram upwardly through the dip pipe 13, past the check valve 15, and gate valve 16, through the pipe 17, and through the valve 18, into the sludge press for filtration through the sludge plates 37.

After the charge of sludge liquid has been forced from the reservoir 14, into the sludge press, of course the float 36, falls again, thereby striking the lower stop 35, of the actuating rod 31, to throw the weighted lever 25, from the right to left hand position or again into the position shown in Fig. 3, so that the air relief valve 24, is opened, and the valve 23, is closed, so that the air pressure within the reservoir is relieved and a flow thereinto of another charge of sludge fluid may readily take place from the tank 9. The operation of the apparatus is automatic, and is governed by the rate of filtration of the sludge liquid through the sludge press, the rate at which the sludge liquid from the sludge ram is filtered through the press at first being comparatively rapid but gradually slows down as the sludge cakes form upon the press plates. The air pressure in the air receiver 1, is maintained substantially constant by the compressor 4, which is driven by the motor 5, and the motor 5 is operated whenever a substantial decrease in pressure within the receiver 1, occurs owing to the fact that the small air line 6, in communication with said receiver 1, leads to the automatic motor switch 7. The automatic switch is caused to close the circuit to the motor whenever the air pressure within the receiver 1, falls below a predetermined amount; the circuit is again opened when the pressure in the receiver rises to a certain predetermined point. The sludge cakes formed within the sludge press on the filtering fabrics 51 and 52, which are, of course, reinforced by the perforated or screen plates 49, may be removed after formation by loosening the lead screw 44, thereby withdrawing the head 42, from the plates 37, which may be separated one from another by sliding along on the guide bars 39. Of course, the filtrate liquid which passes through the filtering material of the press plates may be drawn off through the drain cocks 53.

I am aware that the details of constructions may be varied through a wide range without departing from the principles of this invention, and I therefore do not purpose limiting the patent granted otherwise than necessitated by the prior art.

I claim as my invention:

1. In an apparatus of the class described, a container for sludge liquid, automatically operating mechanism including means adapted to receive a charge thereof from said container and to close communication with said container thereafter, and a sludge press, said mechanism operating to force the received charge of sludge liquid into said press for the recovery of the sludge therefrom, the frequency of said operation being dependent upon the rate of filtration of the sludge liquid through the sludge press.

2. In an apparatus of the class described, a compressed air tank, an air compressor therefor, a sludge liquid container, a sludge press, and means operated by the pressure of air in said air tank for causing the sludge liquid from the storage tank to be forced into said sludge press to recover the sludge therefrom, the frequency of said operation being dependent upon the rate of filtration of the sludge liquid through said sludge press.

3. In an apparatus of the class described, a compressed air tank, a sludge liquid container, a sludge press, and mechanism connected with said air tank and container and with said sludge press and controlled by the pressure in said tank for receiving a charge of sludge liquid from the storage tank and for discharging the same into said sludge press.

4. In an apparatus of the class described, a compressed air tank, a sludge liquid container, a sludge press, mechanism connected with said air tank and container and with said sludge press and controlled by the pressure in said air tank for receiving a charge of sludge liquid from said container and for discharging the same into said sludge press, and means operating automatically to maintain a constant pressure in said air tank.

In testimony whereof I have hereunto subscribed my name in the presence of two subscribing witnesses.

WILLIAM BUCKLEY.

Witnesses:
CHARLES W. HILLS, Jr.,
EARL M. HARDINE.